(12) United States Patent
Kum et al.

(10) Patent No.: US 8,946,362 B2
(45) Date of Patent: Feb. 3, 2015

(54) PROCESS FOR PREPARATION OF OLEFIN POLYMERS

(75) Inventors: Don-Ho Kum, Daejeon (KR); Eun-Jung Lee, Daejeon (KR); Dong-Kyu Park, Daejeon (KR); Choong-Hoon Lee, Daejeon (KR); Jong-Joo Ha, Daejeon (KR); Seung-Whan Jung, Suwon-Si (KR); Jung-A Lee, Daejeon (KR); Seong-Jin Kim, Daejeon (KR)

(73) Assignee: LG Chem, Ltd. (KR)

( * ) Notice: Subject to any disclaimer, the term of this patent is extended or adjusted under 35 U.S.C. 154(b) by 617 days.

(21) Appl. No.: 12/465,055

(22) Filed: May 13, 2009

(65) Prior Publication Data

US 2009/0286943 A1 Nov. 19, 2009

(30) Foreign Application Priority Data

May 14, 2008 (KR) .................. 10-2008-0044528

(51) Int. Cl.
- *C08F 4/52* (2006.01)
- *C08F 4/64* (2006.01)
- *C08F 4/76* (2006.01)

(52) U.S. Cl.
USPC ........... 526/153; 526/148; 526/160; 526/161; 526/170; 526/134; 526/132; 526/348

(58) Field of Classification Search
USPC ............ 526/138, 91, 92, 160, 134, 170, 148, 526/153, 161
See application file for complete search history.

(56) References Cited

U.S. PATENT DOCUMENTS

| 5,234,878 | A | * | 8/1993 | Tsutsui et al. | 502/103 |
|---|---|---|---|---|---|
| 5,350,819 | A | * | 9/1994 | Shaffer | 526/189 |
| 5,661,098 | A | * | 8/1997 | Harrison et al. | 502/120 |
| 5,712,352 | A | * | 1/1998 | Brant et al. | 526/68 |
| 6,017,842 | A | * | 1/2000 | Rosen et al. | 502/124 |
| 6,037,296 | A | | 3/2000 | Hsieh et al. | |
| 6,255,417 | B1 | | 7/2001 | Oh et al. | |
| 6,323,151 | B1 | * | 11/2001 | Siedle et al. | 502/152 |
| 6,521,724 | B2 | * | 2/2003 | Arthur et al. | 526/89 |
| 6,703,458 | B2 | * | 3/2004 | Fait | 526/160 |
| 6,864,333 | B2 | * | 3/2005 | Dall'Occo et al. | 526/161 |
| 6,881,800 | B2 | * | 4/2005 | Friedersdorf | 526/68 |
| 7,847,042 | B2 | * | 12/2010 | Miserque et al. | 526/185 |
| 8,420,733 | B2 | * | 4/2013 | Stakem et al. | 524/773 |
| 2005/0070675 | A1 | * | 3/2005 | Wang | 526/129 |
| 2006/0183631 | A1 | | 8/2006 | Lee et al. | |
| 2006/0287445 | A1 | * | 12/2006 | Whited et al. | 526/124.3 |
| 2007/0225158 | A1 | * | 9/2007 | Lee et al. | 502/152 |
| 2008/0033127 | A1 | * | 2/2008 | Jiang et al. | 526/206 |
| 2009/0270571 | A1 | * | 10/2009 | Wang et al. | 526/160 |

FOREIGN PATENT DOCUMENTS

| CN | 1524885 | 9/2004 | |
|---|---|---|---|
| CN | 1718596 | 1/2006 | |
| CN | 1795211 | 6/2006 | |
| KR | 100386645 | 10/1997 | |
| KR | 19970027115 | 7/2001 | |
| KR | 20070079254 A | 8/2007 | |
| KR | 20070096465 A | 10/2007 | |
| WO | WO 2008/140280 A2 * | 11/2008 | ............ C08F 210/16 |

OTHER PUBLICATIONS

Durrant, J.P.; Durrant, B., Introduction to Advanced Inorganic Chemistry, John Wiley & Sons, Inc., New York, 1970.*
Office Action dated Jun. 30, 2011 of the corresponding application Chinese Patent Application No. 200910142928.
Cho et al., Organometallics, 25; 2133-2134 (2006).

* cited by examiner

*Primary Examiner* — Rip A. Lee
(74) *Attorney, Agent, or Firm* — Lerner, David, Littenberg, Krumholz & Mentlik, LLP

(57) ABSTRACT

The present invention relates to a preparation method of olefin polymers using a catalyst composition containing a transition metal compound. In detail, the present invention provides a preparation method of olefin polymer using a catalyst composition comprising a transition metal compound, wherein the preparation method comprises introducing a scavenger to a continuous solution polymerization reactor in a specific range of amount to give the olefin polymer with good productivity.

8 Claims, 1 Drawing Sheet

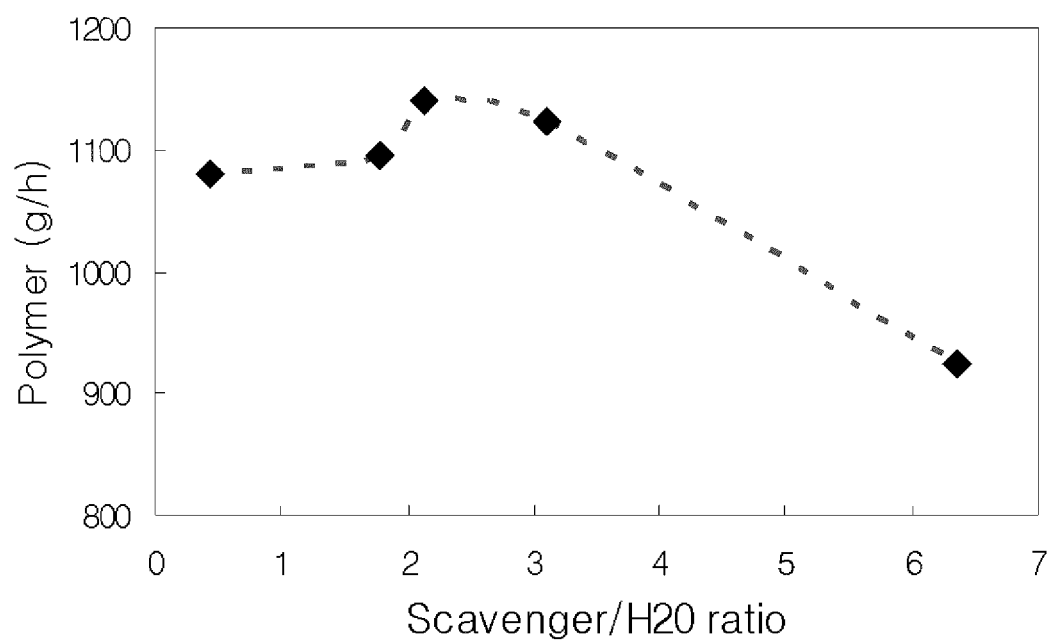

PROCESS FOR PREPARATION OF OLEFIN POLYMERS

CROSS-REFERENCE TO RELATED APPLICATION

This application claims priority from Korean Patent Application No. 10-2008-0044528 filed on May 14, 2008, the disclosure of which is incorporated herein by reference in its entirety.

TECHNICAL FIELD

The present invention relates to a preparation method of olefin polymers using a catalyst composition containing a transition metal compound.

BACKGROUND OF THE INVENTION

The preparation method of olefin copolymer using a general Ziegler-Natta catalyst or metallocene catalyst is enforced industrial widely.

Specially, in the polymerization process of olefin copolymer commercialized with the Ziegler-Natta catalyst, it is generalized that the Ziegler-Natta catalyst is substituted with the metallocene catalyst in rest times. However, because the contents of water, alcohol, other impurities and the like, are high in the above kinds of preparation process, the activity of the catalyst is decreased, and the physical properties of the olefin copolymer which is produced are deteriorated in the polymerization process.

In order to prevent the above problems, the methods for the materials purification were suggested. However, it is necessary to use expensive equipments in the above methods and the purity of the materials which is refined is not high. Accordingly, it is not enough to apply the above methods to the polymerization process of olefin copolymer.

SUMMARY OF THE INVENTION

In order to solve the problems, the present invention provides a preparation method of olefin polymer having superior physical properties with good productivity, by using a scavenger at the amount of specific range in polyolefin polymerization process which uses a catalyst composition comprising a transition metal compound.

The present invention provides a preparation method of olefin polymer using a catalyst composition comprising a transition metal compound, wherein the preparation method comprises a step of introducing a scavenger to a reactor in the amount of 0.4 to 5 times of total content of the water introduced to the reactor.

According to the preparation method of olefin polymer of the present invention, the olefin polymer having superior physical properties can be prepared with good productivity.

BRIEF DESCRIPTION OF THE DRAWING

FIG. 1 is a view that illustrates a yield of polymer produced vs. the amount of a scavenger introduced, according to Examples 1 to 4 and Comparative Example 1 of the present invention.

DETAILED DESCRIPTION

Hereinafter, the present invention will be described in more detail.

In a polyolefin polymerization process which uses a catalyst composition comprising a transition metal compound, the preparation method for the olefin polymer according to the present invention is characterized in that a scavenger is introduced to a reactor in the amount of 0.4 to 5 times of total content of water which is introduced to the reactor.

In the preparation method for the olefin polymer according to the present invention, said scavenger functions as a remover of water, alcohol, and other impurities from the raw materials, which may decrease the activity of the catalyst during the polymerization process.

The scavenger is injected to the reactor preferably in the amount of 0.4~5 times, more preferably 1~4 times of total water content which is injected to the reactor during the polymerization process.

In the case where the content of the scavenger which is injected is out of the range, the productivity of the olefin polymer is decreased, or the polymerization itself may not occur.

In the preparation method for the olefin polymer according to the present invention, it is preferable that said scavenger is mixed with a solvent which contains water before it the scavenger is injected to the reactor, and then the scavenger is injected to the reactor separately with monomers, catalyst composition, and so on.

The scavenger comprises the compound represented by Formula 1, but is not limited thereto:

 Formula 1 wherein,

R's are the same as or different from each other, and each independently halogen; a hydrocarbon having 1 to 20 carbon atoms; or a hydrocarbon having 1 to 20 carbon atoms which is substituted by halogen; and D is aluminium or boron.

In Formula 1, R is preferably halogen or alkyl group having 1 to 20 carbon atoms, more preferably halogen or alkyl group having 1 to 8 carbon atoms.

Examples of the compound represented by Formula 1 include trimethylaluminium, triethylaluminium, triisobutylaluminium, tripropylaluminium, tributylaluminium, dimethylchloroaluminium, triisopropylaluminium, tri-s-butylaluminium, tricyclopentylaluminium, tripentylaluminium, triisopentylaluminium, trihexylaluminium, trioctylaluminium, ethyldimethylaluminium, methyldiethylaluminium, triphenylaluminium, tri-p-tolylaluminium, dimethylaluminiummethoxide, dimethylaluminiumethoxide, trimethylboron, triethylboron, triisobutylboron, tripropylboron, tributylboron, and so on, and more preferable compound is selected from trimethylaluminium, triethylaluminium and triiobutylaluminium.

In the preparation method for the olefin polymer according to the present invention, it is preferable that said transition metal compound in the catalyst composition is a transition metal compound represented by Formula 2:

Formula 2

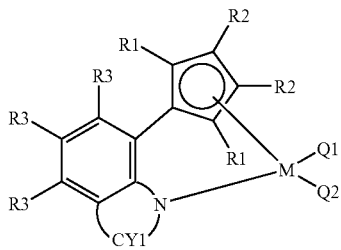

Formula 3

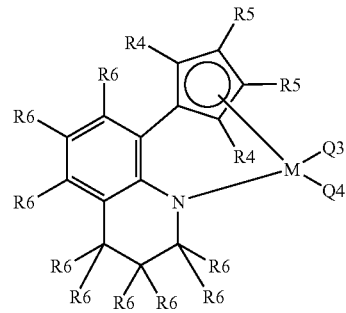

Formula 4

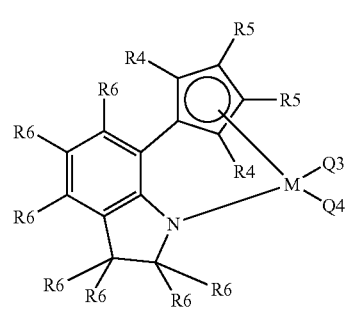

wherein,

R1 and R2 are the same as or different from each other, and each independently hydrogen; an alkyl radical having 1 to 20 carbon atoms; an alkenyl radical having 2 to 20 carbon atoms; an aryl radical having 6 to 20 carbon atoms; a silyl radical; an alkylaryl radical having 7 to 20 carbon atoms; an arylalkyl radical having 7 to 20 carbon atoms; or a Group 14 metalloid radical substituted with hydrocarbyl; and the R1 and R2 or two R2's may be connected to each other by an alkylidene radical containing an alkyl radical having 1 to 20 carbon atoms or an aryl radical having 6 to 20 carbon atoms to form a ring;

R3's are the same as or different from each other, and each independently hydrogen; halogen radical; an alkyl radical having 1 to 20 carbon atoms; an alkenyl radical having 2 to 20 carbon atoms; an aryl radical having 6 to 20 carbon atoms; an alkylaryl radical having 7 to 20 carbon atoms; an arylalkyl radical having 7 to 20 carbon atoms; an alkoxy radical having 1 to 20 carbon atoms; an aryloxy radical having 6 to 20 carbon atoms; or amido radical; and two or more of the R3's may be connected to each other to form an aliphatic or aromatic ring;

CY1 is a substituted or unsubstituted aliphatic or aromatic ring, in which CY1 may be substituted with a halogen radical; an alkyl radical having 1 to 20 carbon atoms; an alkenyl radical having 2 to 20 carbon atoms; an aryl radical having 6 to 20 carbon atoms; an alkylaryl radical having 7 to 20 carbon atoms; an arylalkyl radical having 7 to 20 carbon atoms; an alkoxy radical having 1 to 20 carbon atoms; an aryloxy radical having 6 to 20 carbon atoms; or an amido radical; and two or more substituents may be connected to each other to form an aliphatic or aromatic ring;

M is a Group 4 transition metal; and

Q1 and Q2 are the same as or different from each other, and each independently a halogen radical; an alkyl radical having 1 to 20 carbon atoms; an alkenyl radical having 2 to 20 carbon atoms; an aryl radical having 6 to 20 carbon atoms; an alkylaryl having 7 to 20 carbon atoms; arylalkyl radical having 7 to 20 carbon atoms; an alkyl amido radical having 1 to 20 carbon atoms; an aryl amido radical having 6 to 20 carbon atoms; or alkylidene radical having 1 to 20 carbon atoms.

A term named "hydrocarbyl" means a monovalent substituent formed by the removal of a hydrogen atom from hydrocarbon, and includes ethyl, phenyl or the like.

A term named "metalloid" means a element having similar properties to both metals and non-metals, and includes arsenic, boron, silicon, tellurium or the like.

Of transition metal compound represented by Formula 2, preferred compounds to control the electronic or steric environment around the metal include transition metal compound represented by following Formula 3 or Formula 4:

wherein,

R4 and R5 are the same as or different from each other, and each independently hydrogen; an alkyl radical having 1 to 20 carbon atoms; an aryl radical having 6 to 20 carbon atoms; or a silyl radical;

R6's are the same as or different from each other, and each independently hydrogen; an alkyl radical having 1 to 20 carbon atoms; an alkenyl radical having 2 to 20 carbon atoms; an aryl radical having 6 to 20 carbon atoms; an alkylaryl radical having 7 to 20 carbon atoms; an arylalkyl radical having 7 to 20 carbon atoms; an alkoxy radical having 1 to 20 carbon atoms; an aryloxy radical having 6 to 20 carbon atoms; or an amido radical; and two or more of the R6's may be connected to each other to form an aliphatic or aromatic ring;

Q3 and Q4 are the same as or different from each other, and each independently a halogen radical; an alkyl radical having 1 to 20 carbon atoms; an alkyl amido radical having 1 to 20 carbon atoms; or an aryl amido radical having 6 to 20 carbon atoms; and M is a Group 4 transition metal.

Of transition metal compound represented by Formula 2, preferred compounds to control the electronic or steric environment around the metal include transition metal compounds of following structures:

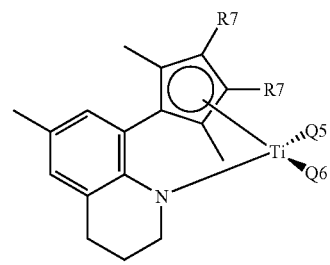

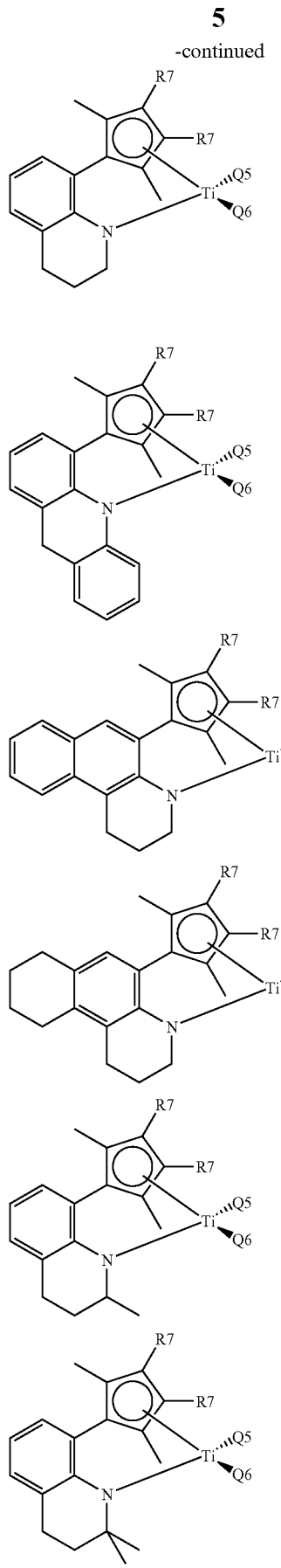
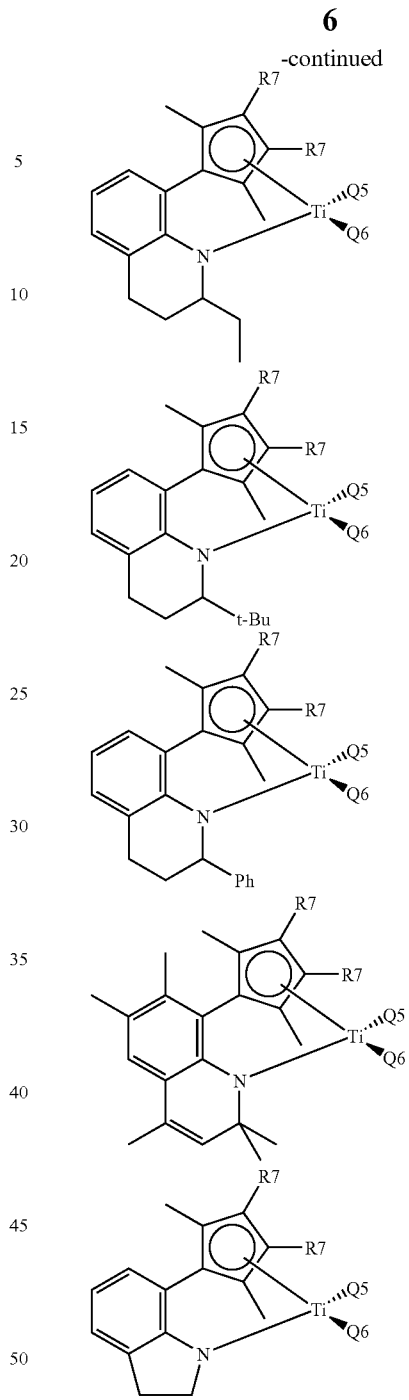

wherein,

R7's are the same as or different from each other, and each independently selected from hydrogen; or a methyl radical; and Q5 and Q6 are the same as or different from each other, and each independently selected from a methyl radical, dimethylamido radical or chloride radical.

In the preparation method for the olefin polymer according to the present invention, the catalyst composition comprising the transition metal compound may comprise one or more of cocatalyst compounds represented by the following Formulae 5 to 7:

—[Al(R8)-O]$_n$—        Formula 5 wherein,

R8's are the same as or different from each other, and each independently a halogen; a hydrocarbon having 1 to 20 carbon atoms; or a hydrocarbon having 1 to 20 carbon atoms which is substituted with halogen;

n is an integer of 2 or more;

$$D(R8)_3 \quad \text{Formula 6}$$

wherein,

R8 is the same as defined in Formula 5;

D is an aluminium or boron;

$$[L-H]^+[ZA_4]^- \text{ or } [L]^+[ZA_4]^- \quad \text{Formula 7}$$

wherein,

L is neutral or cationic Lewis acid;

H is a hydrogen atom;

Z is an element of Group 13; and

A's are the same as or different from each other, and each independently an aryl radical having 6 to 20 carbon atoms, or an alkyl radical having 1 to 20 carbon atoms, at which at least one hydrogen atom is substituted with halogen, an alkoxy, phenoxy or hydrocarbon, having 1 to 20 carbon atoms.

Examples of the compound represented by Formula 5 are methylaluminoxane, ethylaluminoxane, isobutylaluminoxane, butylaluminoxane etc., and more preferable compound is methylaluminoxane.

Examples of the compound represented by Formula 6 include trimethylaluminium, triethylaluminium, triisobutylaluminium, tripropylaluminium, tributylaluminium, dimethylchloroaluminium, triisopropylaluminium, tri-s-butylaluminium, tricyclopentylaluminium, tripentylaluminium, triisopentylaluminium, trihexylaluminium, trioctylaluminium, ethyldimethylaluminium, methyldiethylaluminium, triphenylaluminium, tri-p-tolylaluminium, dimethylaluminiummethoxide, dimethylaluminiumethoxide, trimethylboron, triethylboron, triisobutylboron, tripropylboron, tributylboron, and so on, and more preferable compound is selected from trimethylaluminium, triethylaluminium and triiobutylaluminium.

Examples of the compound represented by Formula 7 include triethylammonium tetraphenyl boron, tributylammonium tetraphenyl boron, trimethylammonium tetraphenyl boron, tripropylammonium tetraphenyl boron, trimethylammonium tetra(p-tolyl) boron, trimethylammonium tetra(o,p-dimethylphenyl) boron, tributylammonium tetra(p-trifluoromethylphenyl) boron, trimethylammonium tetra(p-trifluoromethylphenyl) boron, tributylammonium tetrapentaflourophenyl boron, N,N-diethylanilinium tetraphenyl boron, N,N-diethylanilinium tetraphenyl boron, N,N-diethylanilinium tetrapentafluorophenyl boron, diethylammonium tetrapentafluorophenyl boron, triphenylphosphonium tetraphenyl boron, trimethylphosphonium tetraphenyl boron, triethylammonium tetraphenyl aluminium, tributyl ammonium tetraphenyl aluminium, trimethylammonium tetraphenyl aluminum, tripropylammonium tetraphenyl aluminium, trimethylammonium tetra(p-tolyl) aluminium, tripropylammonium tetra(p-tolyl) aluminium, triethylammonium tetra(o,p-dimethylphenyl) aluminium, tributylammonium tetra(p-trifluoromethylphenyl) aluminium, trimethylammonium tetra(p-trifluoromethylphenyl) aluminium, tributylammonium tetrapentafluorophenyl aluminium, N,N-diethylanilinium tetraphenyl aluminium, N,N-diethylanilinium tetrapentafluorophenyl aluminium, diethylammonium tetrapentafluorophenyl aluminium, triphenylphosphonium tetraphenyl aluminium, trimethylphosphonium tetraphenyl aluminium, tripropylammonium tetra(p-tolyl) boron, triethylammonium tetra(o,p-dimethylphenyl) boron, tributylammonium tetra(p-trifluoromethylphenyl) boron, N,N-diethylanilinium tetraphenyl boron, triphenylcarbonium tetra(p-trifluoromethylphenyl) boron, triphenylcarbonium tetrapentafluorophenyl boron, and the like.

As a first method, the catalyst composition comprising the transition metal compound which may be used in the present invention may be prepared by the methods comprising the steps of:

1) contacting the transition metal compound represented by Formula 2 and the compound represented by Formula 5 or 6 to obtain a mixture; and 2) adding the compound represented by Formula 7 to the mixture.

Additionally, as a second method, the catalyst composition comprising the transition metal compound which may be used in the present invention may be prepared by contacting the transition metal compound represented by Formula 2 and the compound represented by Formula 5.

In the first method among the methods for producing the catalytic composition, the molar ratio of [the transition metal compound of the Formula 2]/[the compound represented by the Formula 5 or 6] is preferably 1/5,000 to 1/2, more preferably 1/1,000 to 1/10, and most preferably 1/500 to 1/20. In the case of when the molar ratio is in the above range, since the amount of the alkylating agent is sufficient, the alkylating of the metal compound may be completely carried out. And side reactions between the remaining alkylating agent in the excessive amount and an activating agent of Formula 7 may be minimized.

Next, the molar ratio of [the transition metal compound of the Formula 2]/[the compound represented by the Formula 7] is preferably 1/25 to 1, more preferably 1/10 to 1, and most preferably 1/5 to 1. In the case of when the molar ratio is in the above range, since the amount of the activation agent is sufficient, the activation of the transition metal compound may be completely performed, thus the activity of the produced catalytic composition may be remained highly. Also, the amount of the remaining activation agent is not too large. Accordingly, the cost of the catalytic composition is economic and the purity of the polymer is good.

In the second method for producing the catalytic composition, the molar ratio of [the transition metal compound of the Formula 2]/[the compound represented by the Formula 5] is preferably 1/10,000 to 1/10, more preferably 1/5,000 to 1/100, and most preferably 1/2,000 to 1/500. In the case of when the molar ratio is in the above range, since the amount of the activation agent is sufficient, the activation of the metal compound may be completely performed, thus the activity of the produced catalytic composition may be remained highly. Also, the amount of the remaining activation agent is not too large. Accordingly, the cost of the catalytic composition is economic and the purity of the polymer is good.

In the production of the catalytic composition comprising the transition metal compound, as the reaction solvent, a hydrocarbon solvent such as pentane, hexane and heptane, or an aromatic solvent such as benzene and toluene can be used. In addition, the transition metal compound and the cocatalysts may be used as supported on silica or alumina.

The preparation method of the olefin copolymer according to the present invention may be a method that is known in the art to which the present invention belongs except using the catalyst composition comprising the transition metal compound and injecting the scavenger to the polymerization process in 0.4~5 times of the total water contents which is injected to the reactor. Using the method, ultra low density polyolefin copolymer may be produced.

Hereinbelow, the present invention will be described based on the continuous solution polymerization process, but not limited thereto.

A) Polymerization Process

In the reactor, the polymerization process proceeds by introducing the catalyst composition containing the transition metal compound and a cocatalyst, monomers, and scavenger. In the case of the copolymer, comonomers are further introduced. In a solution or slurry phase process, a solvent is injected to the reactor. Therefore, in the solution polymerization, a mixed solution of the solvent, catalyst composition, monomer, comonomer and scavenger exists in the reactor.

In the preparation method of the olefin copolymer according to the present invention, useful examples of the olefin monomers or comonomers include ethylene, alpha-olefins and cyclic olefins, and diene olefin monomers or triene olefin monomers having two or more double bonds.

Specific examples of the monomers include ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-itocene, norbornene, norbornadiene, ethylidenenorbornene, phenylnorbornene, vinylnorbornene, dicyclopentadiene, 1,4-butadiene, 1,5-pentadiene, 1,6-hexadiene, styrene, alpha-methylstyrene, divinylbenzene, and 3-chloromethylstyrene, and two or more kinds of the monomers can be mixed for copolymerization.

The solvent may include an aliphatic hydrocarbon solvent having 5 to 12 carbon atoms such as pentane, hexane, heptane, nonane, decane, and isomers thereof; an aromatic hydrocarbon solvent such as toluene and benzene; hydrocarbon solvent substituted with chlorine such as dichloromethane and chlorobenzene; and mixtures thereof, but not limited thereto.

More precisely, an ethylene is the main monomer of the olefin polymer of the present invention, and the comonomer is preferably selected from the group consisting of propylene, 1-butene, 1-hexene, 4-methyl-1-pentene, and 1-octene.

The preparation of the olefin polymer is performed in the presence of the solvent, and if the monomer is the mixture of two monomers, it is more preferable that the first monomer is ethylene, the second monomer is 1-butene and the solvent is n-hexane.

The molar ratio of [monomer]/[comonomer], or [the first monomer]/[the second monomer], suitable to the present invention is 1/100 to 100, preferably 1/10 to 10, and most preferably 1/5 to 2. In the case of when the molar ratio is in the above range, since the density of the produced copolymer is remained low, it is possible to prepare a low density copolymer. Also, since the amount of unreacted comonomer is small, the conversion rate is increased and the process recycling is decreased.

A suitable molar ratio of monomer to solvent is a ratio suitable for dissolving the materials before reaction and the produced polymers after reaction. Specifically, the molar ratio of [monomer]/[solvent] is 1/10,000 to 10, preferably 1/100 to 5, and most preferably 1/20 to 1. In the case when the molar ratio is in the above range, since the amount of solvent is enough, the transportation of the produced copolymer may be smooth. Also, since the amount of solvent is not too high, the equipment and energy costs due to purification and recycling of solvent may be minimized.

The solvent is preferably injected at −40 to 150° C. using a heater or freezer, and thus polymerization reaction is initiated with the mixture of the monomers and the catalyst composition. In the case when the temperature is in the above range, generally since the temperature is not too low, the reaction temperature and the heat of reaction may be easily controlled.

The pressure is increased to 50 bar or more using a high-capacity pump, and then the materials (solvent, monomer, catalyst composition, etc.) are supplied, thereby passing the mixed material without arrangement of reactor, and additional pumping between a pressure drop device and a separator.

The internal pressure of the reactor suitable for the present invention is 1 to 300 bar, preferably 30 to 200 bar, and most preferably 50 to 100 bar. In the case when the internal pressure is in the above range, the high reaction rate increases the productivity, vaporization of the solvent may not be caused, and the equipment cost is not increased due to high pressure.

The copolymers produced in the reactor are maintained at a concentration of 20 wt % or less in the solvent, and after a short retention time, the copolymers are preferably transported to a first solvent separation process for removal of solvent.

The retention time of the copolymers according to the present invention is 1 min to 10 hr, preferably 3 min to 1 hr, and most preferably 5 min to 30 min. In the case when the retention time is in the above range, since the retention time is not too long, reaction proceeds during a suitable activation period of catalyst. Therefore, since the reactor does not need to be oversized, equipment cost may be decreased.

B) Solvent Separation Process

To remove the solvent which is present with copolymers drained out of the reactor, a solvent separation process is performed by changing the temperature and pressure of the solution. The temperature of the polymer solution transported from the reactor is increased to about 200 to 230° C. by a heater, and then its pressure is reduced by a pressure drop device to evaporate unreacted materials and solvent in a first separator.

The internal pressure of the separator suitable for the present invention is 1 to 30 bar, preferably 1 to 10 bar, and most preferably 3 to 8 bar. In the case when the internal pressure of the separator is in the above range, since the viscosity of polymer or mixture is suitable, it causes no transportation problem and it is easy to separate the solvent used in the polymerization.

Also, the internal temperature of the separator is 150 to 250° C., preferably 170 to 230° C., and most preferably 180 to 230° C. In the case when the internal temperature of the separator is in the above range, since the viscosity of polymer or mixture is suitable, it causes no transportation problem and discoloration may not occur due to carbonization of copolymer by high temperature.

The solvent evaporated in the separator may be recycled from an overhead system to a condensed reactor. After the first solvent separation process, a polymer solution concentrated to 65% may be obtained. The concentrated polymer solution is transported to a second separator by a transportation pump through a heater, and the residual solvent is separated in the second separator.

While passing through the heater, a thermal stabilizer is injected to prevent polymer deformation due to high temperature. In addition to the thermal stabilizer, a reaction inhibitor is injected into the heater to prevent polymerization due to activity of activated material present in the polymer solution.

The residual solvent in the polymer solution injected into the second separator is completely removed by a vacuum pump, and particulate polymers can be obtained through cooling water and a cutter. The solvent evaporated in the second separation process and other unreacted monomers are purified and recycled in a recovery process.

C) Recovery Process

The organic solvent injected with materials during polymerization process may be recycled with the unreacted material in the first solvent separation process, and then also used in the polymerization process. However, the solvent recovered in the second solvent separation process is preferably reused after purification in a recovery process, since it is contaminated with the reaction inhibitor which is mixed for termination of catalyst activity, and contains a large amount of water which functions as a catalyst toxin due to steam supply of vacuum pump.

Hereinbelow, the present invention will be described in detail with reference to Examples. However, the following Examples are set forth to illustrate, but are not to be construed to limit the present invention.

EXAMPLES

Examples 1 to 4 and Comparative Examples 1 to 2

Preparation of Olefin Polymer

A hexane (6.09 kg/h) solvent, 1-butene (0.3 kg/h) and ethylene monomer (0.92 kg/h) were supplied into a 1.5 L continuous stirred reactor which was preheated to 100 to 150° C. at a pressure of 89 bars. The compound represented by Formula 2 (LGC001, LG Chem) and an octadecylmethylammonium tetrakis(pentafluorophenyl)borate cocatalyst were supplied from a catalyst storage tank to the reactor to perform copolymerization reaction. The polymerization was performed at a relatively high temperature of 140 to 145° C. The pressure of polymer solution produced by the copolymerization reaction was reduced to 7 bar at the end of the reactor, and then supplied into a solvent separator which was preheated to 230° C., to remove almost of the solvent by the solvent separation process. The residual solvent was completely removed from the copolymers, which were supplied into a second separator by a pump, using a vacuum pump, and then the copolymer was passed through cooling water and cutter to give particulate polymers. The polymerization conditions of ethylene and 1-butene copolymer according to the present invention are shown in the following Table 1.

The content of the scavenger (triisobutyl aluminum) on the basis of the total content of the water supplied to a solvent line before the reactor is shown in the following Table 2. And the physical properties of the olefin copolymer are shown in the following Table 3.

TABLE 1

| | hexane (kg/h) | ethylene (kg/h) | hexane (kg/h) | ethylene (kg/h) | polymerization temperature (° C.) |
|---|---|---|---|---|---|
| Example 1 | 6.09 | 0.87 | 6.09 | 0.87 | 141.6 |
| Example 2 | 6.09 | 0.87 | 6.09 | 0.87 | 142.4 |
| Example 3 | 6.09 | 0.87 | 6.09 | 0.87 | 145.0 |
| Example 4 | 6.09 | 0.87 | 6.09 | 0.87 | 145.0 |
| Comparative Example 1 | 6.09 | 0.87 | 6.09 | 0.87 | 134.0 |
| Comparative Example 2 | 6.09 | 0.87 | 6.09 | 0.87 | — |

TABLE 2

| | hexane (kg/h) | water in hexane (ppm) | water in hexane (mmol/min) | scavenger (mmol/min) | scavenger/water (molar ratio) |
|---|---|---|---|---|---|
| Example 1 | 6.090 | 2.000 | 0.011 | 0.005 | 0.443 |
| Example 2 | 6.090 | 2.000 | 0.011 | 0.020 | 1.773 |
| Example 3 | 6.090 | 2.000 | 0.011 | 0.024 | 2.128 |
| Example 4 | 6.090 | 2.000 | 0.011 | 0.035 | 3.103 |
| Comparative Example 1 | 6.090 | 2.000 | 0.011 | 0.070 | 6.363 |
| Comparative Example 2 | 6.090 | 2.000 | 0.011 | 0 | — |

TABLE 3

| | yield (g/h) | conversion rate of ethylene (wt %) | density (g/cc) | MI 2.16 (g/10 min) |
|---|---|---|---|---|
| Example 1 | 1080 | 89.65 | 0.868 | 0.48 |
| Example 2 | 1094.4 | 90.85 | 0.868 | 0.75 |
| Example 3 | 1140 | 94.63 | 0.868 | 1.18 |
| Example 4 | 1122 | 93.14 | 0.868 | 4.65 |
| Comparative Example 1 | 924 | 76.18 | 0.867 | 6.70 |
| Comparative Example 2 | — | — | — | — |

According to the preparation method of olefin polymer of the present invention, the olefin polymer having superior physical properties can be prepared with good productivity.

The invention claimed is:

1. A preparation method of olefin polymer from olefin monomer using a catalyst composition comprising a transition metal compound and one or more of cocatalyst compounds represented by the following Formulae 6 and 7, wherein the preparation method comprises a step of introducing a scavenger to a reactor in the amount of 0.443 to 3.103 times the total content of water, expressed as a molar ratio, and the scavenger comprises a compound represented by Formula 1:

$$D(R)_3 \quad \text{Formula 1}$$

wherein, R's are the same as or different from each other, and are each independently halogen; a hydrocarbon having 1 to 20 carbon atoms; or a hydrocarbon having 1 to 20 carbon atoms which is substituted by halogen; and D is aluminum;

$$D(R8)_3 \quad \text{Formula 6}$$

wherein, R8's are the same as or different from each other, and are each independently a halogen; a hydrocarbon having 1 to 20 carbon atoms; or a hydrocarbon having 1 to 20 carbon atoms which is substituted with halogen; D is boron;

$$[L-H]^+[BA_4]^- \text{ or } [L]^+[BA_4]^- \quad \text{Formula 7}$$

wherein, L is a neutral Lewis base; [L-H]$^+$ is a cationic conjugate acid of Lewis base L; H is a hydrogen atom; and A's are the same as or different from each other, and are each independently an aryl radical having 6 to 20 carbon atoms, or an alkyl radical having 1 to 20 carbon atoms, at which at least one hydrogen atom is substituted with halogen, an alkoxy, phenoxy or hydrocarbon, having 1 to 20 carbon atoms;

wherein the olefin polymer is produced by a continuous solution polymerization process, a solvent is used in the continuous solution polymerization process, the scavenger is mixed with the solvent, and then the mixture of the scavenger and the solvent is injected to the reactor separately from the catalyst composition comprising the transition metal compound; and based on the scavenger to water molar ratio, the olefin conversion rate is 89.65 wt % to 93.14 wt %.

2. The preparation method of olefin polymer as set forth in claim 1, wherein the scavenger comprises one or more selected from the group consisting of trimethylaluminium, triethylaluminium, triisobutylaluminium, tripropylaluminium, tributylaluminium, dimethylchloroaluminium, triisopropylaluminium, tri-s-butylaluminium, tricyclopentylaluminium, tripentylaluminium, triisopentylaluminium, trihexylaluminium, trioctylaluminium, ethyldimethylaluminium, methyldiethylaluminium, triphenylaluminium, tri-p-tolylaluminium, dimethylaluminiummethoxide, and dimethylaluminiumethoxide.

3. The preparation method of olefin polymer as set forth in claim 1, wherein the transition metal compound is represented by Formula 2:

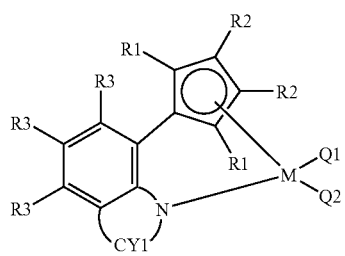

Formula 2 wherein, R1 and R2 are the same as or different from each other, and are each independently hydrogen; an alkyl radical having 1 to 20 carbon atoms; an alkenyl radical having 2 to 20 carbon atoms; an aryl radical having 6 to 20 carbon atoms; a silyl radical; an alkylaryl radical having 7 to 20 carbon atoms; an arylalkyl radical having 7 to 20 carbon atoms; or a Group 4 metalloid radical substituted with hydrocarbyl; and the R1 and R2 or two R2's may be connected to each other by an alkylidene radical containing an alkyl radical having 1 to 20 carbon atoms or an aryl radical having 6 to 20 carbon atoms to form a ring;

R3's are the same as or different from each other, and are each independently hydrogen; halogen radical; an alkyl radical having 1 to 20 carbon atoms; an alkenyl radical having 2 to 20 carbon atoms; an aryl radical having 6 to 20 carbon atoms; an alkylaryl radical having 7 to 20 carbon atoms; an arylalkyl radical having 7 to 20 carbon atoms; an alkoxy radical having 1 to 20 carbon atoms; an aryloxy radical having 6 to 20 carbon atoms; or amido radical; and two or more of the R3's may be connected to each other to form an aliphatic or aromatic ring;

CY1 is a substituted or unsubstituted aliphatic or aromatic ring, in which CY1 may be substituted with a halogen radical; an alkyl radical having 1 to 20 carbon atoms; an alkenyl radical having 2 to 20 carbon atoms; an aryl radical having 6 to 20 carbon atoms; an alkylaryl radical having 7 to 20 carbon atoms; an arylalkyl radical having 7 to 20 carbon atoms; an alkoxy radical having 1 to 20 carbon atoms; an aryloxy radical having 6 to 20 carbon atoms; or an amido radical; and two or more substituents may be connected to each other to form an aliphatic or aromatic ring;

M is a Group 4 transition metal; and

Q1 and Q2 are the same as or different from each other, and are each independently a halogen radical; an alkyl radical having 1 to 20 carbon atoms; an alkenyl radical having 2 to 20 carbon atoms; an aryl radical having 6 to 20 carbon atoms; an alkylaryl having 7 to 20 carbon atoms; arylalkyl radical having 7 to 20 carbon atoms; an alkyl amido radical having 1 to 20 carbon atoms; an aryl amido radical having 6 to 20 carbon atoms; or alkylidene radical having 1 to 20 carbon atoms.

4. The preparation method of olefin polymer as set forth in claim 1, wherein the olefin monomer which is used for the preparation of the olefin polymer comprises one or more selected from the group consisting of ethylene, alpha-olefins, cyclic olefins, diene olefin monomers and triene olefin monomers.

5. The preparation method of olefin polymer as set forth in claim 1, wherein the olefin monomer which is used for the preparation of the olefin polymer comprises one or more selected from the group consisting of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, norbornene, norbornadiene, ethylidenenorbornene, phenylnorbornene, vinylnorbornene, dicyclopentadiene, 1,4-butadiene, 1,5-pentadiene, 1,6-hexadiene, styrene, alpha-methylstyrene, divinylbenzene, and 3-chloromethylstyrene.

6. The preparation method of olefin polymer as set forth in claim 1, wherein the solvent comprises one or more selected from the group consisting of an aromatic hydrocarbon solvent, a hydrocarbon solvent substituted with chlorine and an aliphatic hydrocarbon solvent, having 5 to 12 carbon atoms.

7. The preparation method of olefin polymer as set forth in claim 1, wherein the cocatalyst compound represented by the following Formula 6 is one or more selected from the group consisting of trimethylboron, triethylboron, triisobutylboron, tripropylboron, and tributylboron.

8. The preparation method of olefin polymer as set forth in claim 1, wherein the cocatalyst compound represented by Formula 7 is one or more selected from the group consisting of triethylammonium tetraphenyl boron, tributylammonium tetraphenyl boron, trimethylammonium tetraphenyl boron, tripropylammonium tetraphenyl boron, trimethylammonium tetra(p-tolyl) boron, trimethylammonium tetra(o,p-dimethylphenyl) boron, tributylammonium tetra(p-trifluoromethylphenyl) boron, trimethylammonium tetra(p-trifluoromethylphenyl) boron, tributylammonium tetrapentafluorophenyl boron, N,N-diethylanilinium tetraphenyl boron, N,N-diethylanilinium tetraphenyl boron, N,N-diethylanilinium tetrapentafluorophenyl boron, diethylammonium tetrapentafluorophenyl boron, triphenylphosphonium tetraphenyl boron, trimethylphosphonium tetraphenyl boron, tripropylammonium tetra(p-tolyl) boron, triethylammonium tetra(o,p-dimethylphenyl) boron, tributylammonium tetra(p-trifluoromethylphenyl) boron, N,N-diethylanilinium tetraphenyl boron, triphenylcarbonium tetra(p-trifluoromethylphenyl) boron, and triphenylcarbonium tetrapentafluorophenyl boron.

* * * * *